United States Patent [19]

Knapp

[11] Patent Number: 4,565,792

[45] Date of Patent: Jan. 21, 1986

[54] PARTIALLY STABILIZED ZIRCONIA BODIES

[75] Inventor: Christopher E. Knapp, Niagara Falls, Canada

[73] Assignee: Norton Company, Worcester, Mass.

[21] Appl. No.: 621,017

[22] Filed: Jun. 15, 1984

Related U.S. Application Data

[63] Continuation-in-part of Ser. No. 506,239, Jun. 20, 1983, abandoned.

[51] Int. Cl.$^4$ .............................................. C04B 35/48
[52] U.S. Cl. ..................................... 501/104; 501/103
[58] Field of Search ................................ 501/103, 104

[56] References Cited

U.S. PATENT DOCUMENTS

| | | | |
|---|---|---|---|
| 3,831,857 | 8/1974 | Scott | 239/424 |
| 3,881,282 | 5/1975 | Watson | 501/103 |
| 4,067,745 | 1/1978 | Garvie et al. | 501/104 |
| 4,279,655 | 7/1981 | Garvie et al. | 501/104 |
| 4,344,904 | 8/1982 | Yamada et al. | 264/66 |
| 4,360,598 | 11/1982 | Otagiri et al. | 501/103 |

*Primary Examiner*—Mark L. Bell
*Attorney, Agent, or Firm*—Rufus M. Franklin

[57] ABSTRACT

Stabilized sintered zirconia bodies are made by employing zirconia powders made from rapidly quenched co-fusions of zirconia with a stabilizing metal oxide. Finer crystallinity and higher strength is achieved in the fired body.

7 Claims, No Drawings

PARTIALLY STABILIZED ZIRCONIA BODIES

This invention is a continuation-in-part of my application Ser. No. 506,239, filed on June 20, 1983, now abandoned.

FIELD OF THE INVENTION

This invention relates to sintered zirconia bodies and a powder source for producing such bodies.

BACKGROUND OF THE INVENTION

The stabilization of zirconia in the cubic phase at room temperature has been known for many years. More recently several articles and patents have appeared, describing a stabilized sintered product (PSZ) which contains both the cubic phase and the monoclinic phase or a metastable tetragonal phase, at room temperature. Also described in the literature are polycrystalline tetragonal zirconia bodies (TZP). The strongest reported material of this type has been described by Garvie in U.S. Pat. No. 4,067,745. That patent discloses a sintered body of relatively coarse cubic crystals containing a precipitate of metastable very fine tetragonal crystals.

U.S. Pat. Nos. 4,344,904 and 4,360,598 also disclose sintered partially stabilized zirconia sintered products.

SUMMARY OF THE INVENTION

The invention resides in the discovery that by use of stabilized zirconia powders made from zirconia which has been co-fused with a stabilizing oxide rapidly quenched and reduced to a powder, zirconia bodies may be produced having strength up to 3 times that of otherwise similar sintered zirconia bodies.

The most obvious structural characteristic is the size of the cubic zirconia particles in the product. The zirconia particles in the products of this invention are 5 to 10 micrometers but contain secondary grain boundaries within the particles bringing the effective particle size to a submicron value.

The zirconia powder used in the present invention is made by producing a fusion of a mixture of zirconia and a stabilizing agent. The amount of stabilizing agent may be varied depending upon the result desired. The amount of stabilizing agent is governed by the region of the equilibrium phase diagram which has the desired phase field. Thus on sintering the composition to the 1350° C. -1550° C. range it should be fully in the tetragonal or in the tetragonal and cubic phase region to realize the tetragonal or the tetragonal and cubic phases in the product. Upon normal cooling to room temperature the tetragonal phase is retained in a metastable condition. In the case of $Y_2O_3$ or stabilizing agents this is 1 to 10%; in the case of CaO it is 3.3 to 4.7%; and in the case of MgO it is 2.8 to 4% (all %'s by weight). Mixtures of 2 or more stabilizing agents may be used. Because of non-equilibrium effects such as particle size and rate of temperature change and perhaps others, the published equilibrium data is only a guide. We have found that 2.6% of $Y_2O_3$ is a minimum.

The fused mixture is very rapidly solidified by quenching. A convenient quenching method is air quenching as disclosed in U.S. Pat. No. 3,831,857, in which the molten refractory is blown through a nozzle with pressurized air, to form hollow or solid spherical particles of solidified melt. Alternatively the melt may be solidified in thin layers on or between metal plates or spheres.

This rapid quenching operation is essential to retain the high temperature phases at room temperature and limit crystallite size.

The solidified melt, which ideally consists of tetragonal and cubic crystals with or without some smaller amount of monoclinic zirconia, is reduced, by conventional non-contaminating milling methods (such as vibratory wet milling), to a particle size of a few microns or less, and dried. Although such mechanical action can cause conversion of the tetragonal zirconia, subsequent heating during sintering causes reversion to tetragonal and retention upon cooling due to the effect of crystal size and secondly grain boundaries.

The thus produced dry powder is then milled to break up coarse agglomerates, cold pressed extruded, or otherwised shaped to form suitably shaped green bodies, fired to 1350° to 1550° C., and cooled to room temperature. One hour at temperature is sufficient to produce bodies of maximum strength, and no special cooling or annealing schedule is required. The sintering temperature is determined by the temperature needed to achieve greater than 98% theoretical density and desired crystal structure.

SPECIFIC EMBODIMENT OF THE INVENTION

A co-fusion of zirconia and yttria was made such that the air quenched product has an yttria content of 2.9 mole % (5.2 wt.%). The product was mechanically crushed to finer than about 100 micrometers and then ground in a vibratory (Sweco) mill in water for 28 hours to give a particle size distribution in which 90% of the particles were finer than 1.9 micrometers (as measured by a Coulter counter). The powder was dried in air at about 100° C., milled dry to break up clumps, and screened through a 325 mesh (having openings of about 49 micrometers). Discs, 2.54 cm in diameter and about 0.3 cm in thickness, were made from the dry powder by uniaxially pressing at 3000 psi. The discs were then fired, at atmospheric pressure in air to 1450° C. for 3½ hours and then held at 1450° C. for from 1 to 3½ hours, and then allowed to cool. Results showed that maximum strength was developed within one hour.

If the silica in the fused material is considered too high, it may be reduced by leaching the powder in aqueous alkaline solution and then washing the powder. Acid leaching may also be employed.

In the above example, the highest strength achieved, in a three point bending test (using bar supports) was 290,000 psi for yttria stabilized zirconia made from a powder containing 0.18% silica and 6% yttria. Examination of weaker discs showed mechanical imperfections due to inhomogeneous packing in the pressing operation.

Examination of the pellets showed the main crystalline phases to be tetragonal particles averaging 10 micrometers or less in diameter, the particles contained secondary grain boundaries dividing them into several smaller particles.

Surface grinding of partially stabilized zirconia has been reported to improve the strength of the material by conversion of the tetragonal crystals to monoclinic. Such conversion places the ground surface in compression. This effect was confirmed in the discs of this invention, with the highest strengths being achieved on discs in which the surface tensional in the bending test was the ground surface.

Similar, high strength bodies were made from lime stabilized zirconia. MgO may also be employed as well as other rare earth oxides.

The zirconia products of the present invention have utility as machine parts, extrusion dies, and other uses where high strength, refractory parts of high fracture toughness and resistance to thermal shock are required.

Powders and bodies of zirconia made by the present invention may be used to make wear resistant strong parts for mechanical and thermal resistance and may be used to make tubes for oxygen sensing or other devices utilizing the oxygen ion conductivity of the zirconia.

What is claimed is:

1. A crystalline sintered stabilized zirconia body made from a powder, said powder consisting essentially of a cofusion of zirconia and from 2.6% to 10% of a stabilizing metal oxide, the crystals in said body having a size of 10 microns or less.

2. A stabilized zirconia body as in claim 1 in which the stabilizing agent selected from the group consisting of calcia, yttria, magnesia, stabiliziing rare earth oxides and mixtures thereof.

3. A powder for the production of sintered stabilized zirconia consisting essentially of from 2.6% zirconia co-fused with to 10% of one or more stabilizing agents, then rapidly quenched and milled to a powder.

4. A powder as in claim 3 in which the stabilizing agent is selected from the group consisting of calcia, yttria, magnesia, and other rare earth stabilizing oxides, and mixtures thereof.

5. A powder as in claim 3 which has been chemically leached to reduce silica content, introduced with raw materials in the fusion.

6. A method of forming stabilized sintered zirconia bodies consisting essentially of zirconia and from 2.6% to 10% of a stabilizing metal oxide comprising the steps of (1) reducing to powder form a rapidly quenched co-fusion of zirconia and a stabilizing agent, molding the powder to shape, firing said shape at 1350° C. to 1550° C. for a time sufficient to develop a strong sintered bond between the grains of the body.

7. A sintered stabilized zirconia body consisting essentially of zirconia and from 2.6% to 10% of a stabilizing metal oxide having stabilized zirconia particles of 10 microns or less and a bending strength of greater than 200,000 psi.

* * * * *

UNITED STATES PATENT AND TRADEMARK OFFICE
CERTIFICATE OF CORRECTION

PATENT NO. : 4,565,792
DATED : January 21, 1986
INVENTOR(S) : Christopher E. Knapp It is certified that error appears in the above-identified patent and that said Letters Patent is hereby corrected as shown below:

Claim 3 should read as follows:

A powder for the production of sintered stabilized zirconia consisting essentially of zirconia co-fused with from 2.6% to 10% of one or more stabilizing agents, then rapidly quenched and milled to a powder.

Signed and Sealed this

Nineteenth Day of April, 1988

Attest:

DONALD J. QUIGG

Attesting Officer

Commissioner of Patents and Trademarks